(12) United States Patent
Andjelkovic et al.

(10) Patent No.: US 9,034,982 B2
(45) Date of Patent: May 19, 2015

(54) FORMULATIONS COMPRISING ISOSORBIDE-MODIFIED UNSATURATED POLYESTER RESINS AND LOW PROFILE ADDITIVES WHICH PRODUCE LOW SHRINKAGE MATRICES

(75) Inventors: Dejan D. Andjelkovic, Dublin, OH (US); Darcy A. Culkin, Dublin, OH (US); Roman Loza, Dublin, OH (US); Michael J. Sumner, Dublin, OH (US); Timothy A. Tufts, Powell, OH (US); Dennis H. Fisher, Westerville, OH (US)

(73) Assignee: ASHLAND LICENSING AND INTELLECTUAL PROPERTY, LLC, Dublin, OH (US)

( * ) Notice: Subject to any disclaimer, the term of this patent is extended or adjusted under 35 U.S.C. 154(b) by 696 days.

(21) Appl. No.: 12/539,659

(22) Filed: Aug. 12, 2009

(65) Prior Publication Data

US 2011/0040004 A1    Feb. 17, 2011

(51) Int. Cl.
*C08G 63/60* (2006.01)
*C08K 5/00* (2006.01)

(52) U.S. Cl.
CPC ................................... *C08K 5/0008* (2013.01)

(58) Field of Classification Search
CPC .............................. C08K 5/0008; C08L 67/06
USPC .......................................................... 524/599
See application file for complete search history.

(56) References Cited

U.S. PATENT DOCUMENTS

| | | | |
|---|---|---|---|
| 4,269,745 A | 5/1981 | Neumann | |
| 5,109,097 A | 4/1992 | Klun et al. | |
| 5,504,151 A | 4/1996 | Fisher et al. | |
| 5,756,554 A | 5/1998 | Fisher | |
| 5,958,581 A * | 9/1999 | Khanarian et al. | 428/357 |
| 5,959,066 A | 9/1999 | Charbonneau et al. | |
| 6,063,464 A | 5/2000 | Charbonneau et al. | |
| 6,107,446 A | 8/2000 | Loza et al. | |
| 6,126,992 A | 10/2000 | Khanarian et al. | |
| 6,222,005 B1 | 4/2001 | Loza et al. | |
| 6,410,130 B1 | 6/2002 | Schuhmacher et al. | |
| 6,485,819 B2 | 11/2002 | Hayes | |
| 6,737,481 B1 | 5/2004 | Kurian et al. | |
| 6,818,730 B2 | 11/2004 | Brandenburg et al. | |
| 6,828,411 B2 | 12/2004 | Frings et al. | |
| 6,861,494 B2 | 3/2005 | DeBruin | |
| 6,903,164 B2 | 6/2005 | Yabui et al. | |
| 6,977,291 B2 | 12/2005 | Sunkara et al. | |
| 7,211,633 B2 | 5/2007 | DeBruin | |
| 2003/0055142 A1 | 3/2003 | Steckel | |
| 2003/0204029 A1 * | 10/2003 | Brandenburg et al. | 525/444 |
| 2006/0204771 A1 * | 9/2006 | Tan et al. | 428/480 |
| 2008/0090954 A1 * | 4/2008 | Sumner et al. | 524/500 |

FOREIGN PATENT DOCUMENTS

| | | |
|---|---|---|
| GB | 927786 | 6/1963 |
| GB | 1012563 | 12/1965 |

OTHER PUBLICATIONS

Okada et al. "Synthesis and biodegradability of polyesters based on 1,4:3,6-dianhydrohexitols and succinic acid derivatives", Biodegradable Plastics and Polymers, 1994 Elsevier Science, p. 511-518.*
Okada et al. ("Synthesis and biodegradability of polyesters based on 1,4:3,6-dianhydrohexitols and aliphatic dicarboxylic acid", J.Polym. Sci., Part A : Polym.Chem.33. 2813-2820 (1995).*
ISR and WO from International Searching Authority in corresponding PCT application.

* cited by examiner

*Primary Examiner* — Wenwen Cai
(74) *Attorney, Agent, or Firm* — Mark A. Montana

(57) ABSTRACT

Formulations comprising an isosorbide-modified unsaturated polyester comprising maleic acid, fumaric acid, itaconic acid or maleic anhydride and isosorbide and one or more low profile additives. The formulations exhibit better shrink control in molding compound formulations with standard low profile additives than their non-isosorbide-modified analogues. These isosorbide-modified unsaturated polyester resins may be applied in molding compounds like sheet molding compounds or bulk molding compounds and may be components of fiber reinforced composites or other composite materials.

22 Claims, No Drawings

FORMULATIONS COMPRISING ISOSORBIDE-MODIFIED UNSATURATED POLYESTER RESINS AND LOW PROFILE ADDITIVES WHICH PRODUCE LOW SHRINKAGE MATRICES

BACKGROUND OF THE INVENTION

1. Field of the Invention

The invention concerns isosorbide-modified unsaturated polyester resins and particularly formulations comprising the isosorbide-modified unsaturated polyester resins and low profile additive ("LPA"). The formulations can be incorporated into molding compounds, for example sheet molding compounds ("SMC") and bulk molding compounds ("BMC"). The molding compounds can be applied in fiber reinforced composites ("FRC"). The formulation may also be applied in making laminates and the like. The FRC and laminates and other similar materials comprising the isosorbide-modified unsaturated polyester resins and LPA will produce low shrink matrices.

2. The Related Art

Unsaturated polyester resin ("UPR") and vinyl ester resin ("VER"), which are solutions comprising reactive monomer such as styrene, reinforced with glass fibers are used extensively as components of FRC. Cured FRC made from these compounds offer numerous advantages over their metallic counterparts, such as lower weight, lower coefficients of thermal expansion, higher thermal damping, better design flexibility, and the like. For example, due to their low specific gravities, FRC possess superior strength-to-weight and modulus-to-weight ratios relative to metals. Furthermore, FRC enables manufacturers to consolidate multi-component metal parts into one composite part, which results in considerable manufacturing and assembly cost reductions.

Isosorbide is referred to as a "sugar diol" because it is derived from D-glucose which ultimately is generated from starch. Isosorbide can be included as a glycol into unsaturated polyesters using standard polyester synthetic techniques.

As a result of the advantages of FRC or other composite materials, these materials are desired for use in many industries. For example, FRCs are applied in the transportation industry as a light weight, cost effective replacement for metal to result in lower cost and greater fuel efficiency vehicles, such as automotives, trucks, airplanes, boats, train cars and the like. Other industries where FRC is used include the manufacture of plumbing fixtures like piping, bath and shower surrounds, countertops and the wind energy industry. Composites based on infusion technology can be applied in various aspects of the transportation industry, including in boats and other watercraft.

One of the factors that influence several important properties of thermosetting composites, such as FRC, is negative volumetric change (shrinkage) during cure. UPRs and VERs cure via addition polymerization reaction of all reactive functionalities to produce crosslinked thermosetting material. During this process, shrinkage may be caused by several factors, one of which is that before the commencement of the polymerization (e.g. in the monomer form) molecules are positioned at a van der Walls distance from one another, while after the cure (in the polymer form) the corresponding monomeric units are joined covalently and move closer to each other. Therefore, monomeric units are closer to each other in the polymer form than in the monomer form, which results in the net volume shrinkage. Other lesser but still contributing factors, are change in entropy in going from monomer to polymer and the free volume and efficiency of monomer and polymer packing.

The degree of shrinkage is dependent on the polymerization temperature. Generally, room temperature cure conditions result in less shrinkage than if the cure is performed at elevated temperatures. For example, shrinkage during SMC molding (~300° F.) is more extensive due to effects of thermal expansion. If post-cure of a composite part is required during manufacturing or processing, then additional shrinkage may occur. This is attributed to the fact that free-radical polymerization reactions are rarely driven to completion and small amounts of unreacted monomers or oligomers are present in the cured material.

Due to shrinkage, crosslinked polyester composite materials, such as FRC, generally have poor surface quality or surface "profile". Typically, large peaks and valleys can be observed on the surface of composite parts. Considerable efforts have been made by resin and part manufacturers to improve the surface profile and dimensional stability of these materials. LPAs, which typically are thermoplastic additives, are mentioned in the art as a means to improve the surface quality of UPR and VER based composite parts. Such thermoplastics include polystyrene, polyesters, polyacrylates, polymethacrylates, polyvinylacetate, polyurethanes, and various polyglycols, and the like. LPA materials substantially improve the surface profile of the composite material by reducing resin shrinkage which results in a material with a smoother surface quality which produces a smoother surface appearance. The surface of the material tends to have a reduced distance between peaks and valleys or a "lower profile".

Incorporation of LPAs into composite materials may affect mechanical properties of the composite. Thus, the need to incorporate LPAs into the composite material to achieve desired surface quality may limit the use of composite materials for applications where higher mechanical strength is required or conversely in applications requiring high mechanical strength, surface characteristics may be sacrificed due to limitations in the type and/or amount of LPA that can be added to the material.

The art of composite materials constantly seeks materials which provide effective shrink control. We have found that isosorbide-modified unsaturated polyester, and formulations comprising such polyester, incorporated into composite materials, for example FRC materials, provide for improved shrink control and/or surface quality of molded composite parts. While not wishing to be bound to any theory, the inventors believe that the isosorbide-modified unsaturated polyester, and formulations comprising such polyester, may enhance the profiling efficiency of standard LPAs and/or improve surface characteristics of molded composite parts comprising the formulation having isosorbide-modified unsaturated polyester and LPAs.

All parts and percentages set forth in this specification and the appended claims are on a weight-by-weight basis unless specified otherwise.

SUMMARY OF THE INVENTION

The invention pertains to isosorbide-modified unsaturated polyester and formulations comprising such polyester and one or more LPAs. The isosorbide-modified unsaturated polyester comprises dicarboxylic acids or anhydrides selected from the group consisting of maleic acid, fumaric acid, itaconic acid, maleic anhydride and combinations thereof and glycols having at least isosorbide. Isosorbide-modified unsaturated polyester can be made by combining the dicarboxylic acids or anhydrides with the glycols. Isosorbide-modified unsaturated polyester resin typically comprises the isosorbide-modified unsaturated polyester described herein in a solution with, at least, a reactive (copolymerizable) solvent, such as styrene. The terms isosorbide-modified unsaturated polyester and isosorbide-modified unsaturated polyester resin are used herein interchangeably.

The formulations can generally be used to make composite materials. In embodiments the formulations for making the composite material may further comprise one or more copolymerizable solvents. For example the formulations can be applied in molding compounds like SMC and BMC which can be used in making FRC materials. In addition to the isosorbide-modified unsaturated polyester resin and LPA, the composite materials may comprise curing agents, accelerating agents, reinforcements such as natural or glass fibers, particles and whiskers, core components, such as wooden balsa or urethane corefoams for high strength lightweight composites, additives and fillers such as glass, wood flour, metal filings, and inorganic fillers such as sand or clay, pigments, release agents, plasticizers, and the like.

DETAILED DESCRIPTION OF THE INVENTION

The formulations comprise the isosorbide-modified unsaturated polyester and at least one LPA. The formulation may further comprise non-isosorbide modified unsaturated polyester, which is unsaturated polyester that does not comprise isosorbide, and/or vinyl ester, including vinyl ester resin, and combinations of these. The isosorbide-modified unsaturated polyester typically comprises ethylenically unsaturated dicarboxylic acids or anhydrides, such as maleic acid, fumaric acid, itaconic acid and maleic anhydride, and isosorbide. In addition, the polyester may further comprise one or more other dicarboxylic acids and/or anhydrides such as those selected from the group consisting of isophthalic acid, phthalic anhydride, terephthalic acid, adipic acid, succinic acid, succinic anhydride and the like, and combinations thereof.

The formulation may further comprise one or more glycols in addition to the isosorbide, such as those selected from the group consisting of ethylene glycol, 1,2-propanediol, 1,3-propanediol, diethylene glycol, dipropylene glycol, neopentyl glycol, hexanediol, butanediol, and the like and combinations thereof. Typically, the glycols are applied in making the polyester and may be part of the polyester component of the formulation. In an embodiment of the invention, the formulation comprises isosorbide in amounts of about 10 mole % to about 60 mole % based on the total amount of glycol in the formulation and about 40 mole % to about 90 mole % based on the total amount of glycol in the formulation of glycols other than isosorbide.

The formulation may further comprise chain extending compounds to alter the chain length of the isosorbide-modified unsaturated polyester. For example, chain extending compounds such as epoxy resins, like glycidyl ethers of bisphenol A or phenol-formaldehyde novolacs, epoxidized vegetable oils, epoxidized fatty acids and their esters, cycloaliphatic epoxides and the like, or combinations thereof, may be included in the formulation. Furthermore, hydroxyl groups of isosorbide-modified unsaturated polyesters enable isocyanate chain extension, typically polyisocyanate chain extension. Some of the useful isocyanates and polyisocyanates include toluene diisocyanate (TDI), methylene di-para-phenylene isocyanate (MDI), polymeric MDI and aliphatic polyisocyanates, such as isophorone diisocyanate (IPDI). Typically, the amount of material used to alter the chain length, such as epoxide and/or isocyanate chain extension moieties, is up to about 15 weight percent, based on the total weight of the isosorbide-modified polyester having altered chain length, such as from about 0.1 weight percent to about 15 weight percent. Preferably, however, the amount of material used to alter the chain length is up to about 5 weight percent, based on the total weight of the isosorbide-modified polyester having altered chain length, such as from about 0.1 weight percent to about 5 weight percent.

Thermoplastic LPAs, such as those selected from the group consisting of polystyrene, polyesters, polyacrylates, polymethacrylates, polyvinyl acetate, polyurethanes, polyepoxides, polyglycols and the like and combinations thereof are used in the formulation. Polyacrylates, such as ELVACITE® acrylic resins are available from LUCITE® International, Southampton, United Kingdom ("Lucite"). Examples of LPA preparations are ENVIREZ® and AROPOL™ resins both available from Ashland Inc., Dublin, Ohio, USA ("Ashland"). The LPA is generally used at a level effective for shrink control. The formulation typically comprises from about 35% to about 50% of unsaturated polyester and about 5% to about 35% of LPA. The unsaturated polyester component comprises from about 10% to about 100% of isosorbide-modified unsaturated polyester.

The formulation comprising the isosorbide-modified unsaturated polyester resin and LPA may be processed into composites using methods known in the art. These include but are not limited to SMC/BMC compounding, closed molding processes such as vacuum-assisted bag molding, open molding processes such as spray or hand lay up processes, compression molding and pultrusion processes. The isosorbide-modified unsaturated polyester resin may be used to make composite materials by infusion of the resin into a reinforcing material or other core material, for example a core material like a wooden balsa core, polyurethane foam core or combinations thereof to make reinforced and/or laminated materials comprising the isosorbide-modified unsaturated polyester resin.

Generally, in making of composites, the isosorbide-modified unsaturated polyester will first be diluted using reactive copolymerizable solvents and will be processed with one or more LPAs and/or other UPR and/or VER in order to produce appropriate resins and blends. Thus, in embodiments of the invention the formulation may comprise copolymerizable solvents and such copolymerizable solvents may be considered as part of a resin comprising the isosorbide-modified unsaturated polyester.

In formulations comprising the isosorbide-modified unsaturated polyester, LPA and copolymerizable solvent, the amount of copolymerizable solvent is typically about 15% to about 60% by weight. The copolymerizable solvent is typically a reagent such as styrene, vinyl toluene, methacrylic esters, acrylic esters, divinyl benzene, and various multifunctional acrylates, methacrylates, and diallylphthalate and the like and combinations thereof.

Molding compounds, such as SMC and BMC, can be prepared from the formulations described above. The molding compounds will also comprise other conventional components. These components include the following: fillers such as $CaCO_3$, clay, alumina, trihydrate, talc, wollastonite, carbon black, fumed silica and other nano-sized materials, glass microspheres and the like, and combinations thereof; reinforcement materials such as chopped fiber glass, carbon fibers, boron nitride whiskers, bio-fibers and the like and combinations thereof; mold release agents, such as calcium, zinc, magnesium, sodium stearate and the like and combinations thereof and viscosity modifiers such as Group II metal oxides and hydroxides, like magnesium and calcium oxides and the like and combinations thereof. Other components that may be incorporated include low shrink enhancers like those described in U.S. Pat. No. 5,504,151 which is incorporated herein in its entirety by reference, impact modifiers, pigments, dyes, curing agents, accelerating agents, plasticizers and stabilizers. The molding compound may comprise one or more of these components, all of these components and combinations of components. Typically, molding compound comprises reinforcement materials in an amount ranging from about 20 to about 300 parts by weight per 100 parts by weight of the formulation and fillers in an amount of from about 50 to about 1,000 parts, preferably about 50 to about 200 parts, by weight per 100 parts by weight of the formulation.

Composite formulations containing the formulations having isosorbide-modified unsaturated polyester resin and LPA can be polymerized and cured into networks using curing agents, i.e. polymerization initiators. The initiators, such as peroxide and/or azo type, generate free radicals upon decomposition which initiate the polymerization and curing process. Typical peroxide initiators are organo peroxides and hydroperoxides such as benzoyl peroxide, dicumyl peroxide, methyl ethyl ketone peroxide, lauryl peroxide, cyclohexanone peroxide, t-butyl perbenzoate, t-butyl hydroperoxide, t-butyl benzene hydroperoxide, cumene hydroperoxide, butyl peroctoate and the like and combinations thereof. Typical azo compounds are azobisisobutyronitrile, 2-t-butylazo-2-cyano-4-methylpentane, 4-5-butylazo-4-cyano-valeric acid and the like and combinations thereof. Combinations of peroxide and azo compounds can be used. Preferred initiators are organic peroxides. The polymerization initiators are generally used in amounts from about 0.1 to about 5 parts by weight per 100 parts by weight of thermoset mixture.

Incorporation of isosorbide moieties into the unsaturated polyester structures, and formulations comprising such isosorbide-modified polyester, for example resins, reduces shrinkage of the resulting LPA-containing composite to an extent which is greater than in analogous non-modified unsaturated polyester formulations, including resins comprising such non-modified species. Thus, with the formulations having the isosorbide-modified unsaturated polyester and LPA described herein, similar or lower amounts of LPA, compared to conventional unsaturated polyester, are needed to achieve the same or better level of shrinkage control in composite parts. The isosorbide-modified unsaturated polyester formulations described herein provide the ability to achieve similar or better surface quality of their molded parts than non-modified counterparts, including resins comprising such material, at lower or the same LPA levels respectively.

Further, the isosorbide-modified unsaturated polyester may decrease the need for synthesis of new or modified LPAs to achieve desired shrink control as well as to reduce or eliminate the use of shrink control enhancer additives to obtain desired shrink efficiency and surface quality. The formulation comprising the isosorbide-modified unsaturated polyester and LPA provide the ability to make a composite material or part having desired shrink characteristics and mechanical properties with different LPA and/or enhancers and/or less LPA and/or enhancers than required for non-modified unsaturated polyesters and associated resins.

EXAMPLES

Examples 1-4

Synthesis of Isophthalic Acid/Propylene Glycol Isosorbide-Modified Unsaturated Polyester Resins A two-liter kettle was equipped with a condenser, distillation head, mechanical stirrer, nitrogen inlet, and two thermocouples. Isophthalic acid (IPA), propylene glycol (PG), isosorbide (ISOS), dibutyltin oxide catalyst (FASCAT® 4100 butylstannoic acid (CAS 2273-43-0, Arkema Inc, Philadelphia, Pa.)), 140 ppm), and hydroquinone (HQ, 75 ppm) were charged to the reactor such that a charge ratio of glycol to isosorbide ranged from about 100:0 to about 60:40. The amounts of raw materials for each cook are listed in Table 1. Example 1 is a comparative example containing no isosorbide. The solution was heated to 200° C. while rapidly stirring and kept at this temperature until an acid value less than 20 was reached. The reaction was then cooled to 170° C. and maleic anhydride (MAN) was added and allowed to exotherm. Once the exotherm was complete, the reaction was heated to 200° C. and kept at this temperature until an acid value between 15 and 18 was reached. The reaction was then cooled to 120° C., diluted with styrene (until ~70% NV was reached), and inhibited with parabenzoquinone (PBQ, 10 ppm), and mono-tent-butyl hydroquinone (MTBHQ, 55 ppm).

TABLE 1

List of raw materials used in Examples 1-4.

| | EX. 1 (comp.) | EX. 2 | EX. 3 | EX. 4 |
| | | PG/ISOS Mol Ratio | | |
| Component | 100:0 Grams | 90:10 grams | 80:20 grams | 60:40 grams |
| PG | 504.98 | 454.51 | 404.02 | 303.00 |
| ISOS | 0.00 | 96.95 | 193.90 | 378.81 |
| IPA | 450.95 | 450.95 | 450.95 | 450.95 |
| MAN | 300.00 | 300.00 | 300.00 | 300.00 |
| FASCAT ® 4100 | | 140 ppm | | |
| HQ | | 75 ppm | | |
| PBQ | | 10 ppm | | |
| MTBHQ | | 55 ppm | | |

Examples 5 and 6

Shrinkage Control Measurements of Isophthalic Acid/Propylene Glycol Isosorbide Modified Unsaturated Polyester/LPA/Styrene Formulations Several different formulations were evaluated in terms of shrink control by blending all ISOS-modified IPA/PG unsaturated polyester resins (UPR) of Examples 1-4 with different low profile additive (LPA)-solutions in styrene. Styrene was added as necessary to adjust polymer percentages in the mixture. One hundred parts of the resin mixture contained approximately 42-43% of solid UPR (Examples 1-4), 14% of solid LPA, 43-44% styrene, and 0.5% of a 12% solution of cobalt octoate. To the 100 parts of this mixture was added either 35 or 180 parts of filler, 1.5 parts TBPB initiator, and 4.5 parts zinc stearate mold release agent. The contents were thoroughly mixed and placed in a machined aluminum frame and molded using 15 tons of pressure at 150° C. for two minutes. The solid part was removed from the mold, allowed to cool, and the dimensions of the part were measured and compared to those of the cold frame. The degree of shrinkage was calculated and reported in mils/in, where "mils" represent $10^{-3}$ inches. The following Tables 2 and 3 show measured shrinkages for different formulations. A negative sign in front of the reported values indicates expansion. Expansion defines the part as being larger than the dimensions of the cold frame mold that was used to fabricate it.

TABLE 2

Shrinkage measurements of the 100:0, 90:10, 80:20,
and 60:40 ISOS-modified IPA/PG UPR's with 5 different
LPA's at 180 phr CaCO₃ filler (Example 5)

| PG/ISOS Molar ratio | LPA | | | | |
|---|---|---|---|---|---|
| | Q701C | ELVACITE ® 2014 | ELVACITE ® 4076 | ELVACITE ® 4077 | LP 40A |
| | | | Shrinkage (mils/in) | | |
| 100:0 (Ex. 1) | 6.96 | 2.23 | 0.33 | 1.95 | 4.18 |
| 90:10 (Ex. 2) | 1.39 | −0.8 | −2.14 | −1.44 | 0.34 |
| 80:20 (Ex. 3) | 0.22 | −2.67 | −4.62 | −2.53 | −1.62 |
| 60:40 (Ex. 4) | −5.98 | −9.68 | −9.82 | −7.74 | −6.31 |

Q701C and LP40A are available from Ashland
ELVACITE ® 2014, 4076 and 4077 are available from LUCITE

TABLE 3

Shrinkage measurements of the 100:0, 90:10, 80:20, and 60:40 ISOS-
modified IPA/PG UPR's with ELVACITE ® 4076 LPA at 35 phr filler
consisting of 4:1 mixture of Mica and Diatomaceous Earth (Example 6)

| PG/ISOS Molar Ratio | Q701C |
|---|---|
| 100:0 (Ex. 1) | 9.80 |
| 90:10 (Ex. 2) | 1.46 |
| 80:20 (Ex. 3) | −6.65 |
| 60:40 (Ex. 4) | −10.21 |

Examples 7 and 8

Synthesis of Isosorbide Modified Isophthalic
Acid/Diethylene Glycol/Propylene Glycol
Unsaturated Polyester Resin A two-liter kettle was equipped with a condenser, distillation head, mechanical stirrer, nitrogen inlet, and two thermocouples. Isophthalic acid (IPA), diethylene glycol (DEG), propylene glycol (PG), isosorbide (ISOS), hydroquinone (HQ, 75 ppm), and dibutyltin oxide (FASCAT® 4100, 140 ppm) were charged to the reactor such that a charge ratio of PG to DEG to ISOS was used that ranged from about 56:44:0 to about 56:20:24. Example 7 is a comparative example containing no isosorbide. The amounts of raw materials for each cook are listed in Table 4. The solution was heated to 200° C. while rapidly stirring and kept at this temperature until an acid value less than 20 was reached. The reaction was then cooled to 170° C. and maleic anhydride (MAN) was added and allowed to exotherm. Once the exotherm was complete, the reaction was heated to 200° C. and kept at this temperature until an acid value between 25 and 30 was reached. The reaction was then cooled to 120° C., diluted with styrene (until ~70% NV was reached), and inhibited with parabenzoquinone (PBQ, 10 ppm), and mono-tert-butyl hydroquinone (MTBHQ, 55 ppm).

TABLE 4

List of raw materials used in Examples 7 and 8

| Component | EX. 7 (comp.) | EX. 8 |
|---|---|---|
| | PG/DEG/ISOS Mol Ratio | |
| | 56:44:0 Grams | 56:20:24 grams |
| PG | 262.55 | 262.55 |
| ISOS | 0.00 | 216.03 |
| DEG | 267.76 | 110.90 |
| IPA | 364.89 | 364.89 |
| MAN | 325.00 | 325.00 |
| FasCat 4100 | | 140 ppm |
| HQ | | 75 ppm |
| PBQ | | 10 ppm |
| MTBHQ | | 55 ppm |

Example 9 and 10

Shrinkage Control Measurements of the Isosorbide
Modified Isophthalic Acid/Diethylene
Glycol/Propylene Glycol Unsaturated
Polyester/LPA/Styrene Formulations Seven different formulations were evaluated in terms of shrink control by blending the ISOS-modified IPA/DEG/PG UPR from Examples 7 and 8 with different LPA solutions in styrene. Styrene was added as necessary to adjust polymer percentages in the mixture. One hundred parts of resin mixture contained approximately 42-43% UPR, 14% LPA, 43-44% styrene and 0.25% of a 12% solution of cobalt octoate. To the 100 parts of this mixture was added 180 parts of CaCO₃ filler, 1.5 parts TBPB initiator, 4.5 parts zinc stearate mold release agent, and 13 parts thickening agent. The contents were thoroughly mixed and placed in a machined aluminum frame and molded using 15 tons of pressure at 150° C. for two minutes. The solid part was removed from the mold, allowed to cool, and the dimensions of the part were measured and compared to those of the cold frame. The degree of shrinkage was calculated and reported in mils/in, where "mils" represent $10^{-3}$ inches. The following tables show the measured shrinkage for different formulations. A negative sign in front of the reported values indicates expansion. Expansion defines the part as being larger than the dimensions of the cold frame mold that was used to fabricate it.

TABLE 5

Shrinkage measurements of the 56:44:0 and 56:20:24 ISOS-modified IPA/DEG/PG UPR's versus 6 different LPA's at 180 phr CaCO₃ filler.

| PG/DEG/ISOS Molar Ratio | LPA | | | | | |
|---|---|---|---|---|---|---|
| | Q8000 | ENVIREZ® 2431 | Q701C | LP 4016 | AROPOL™ 59021 | AROPOL™ 59019 |
| | | | Shrinkage (mils/in) | | | |
| 56:44:0 (EX. 9) | 23.80 | 22.10 | 7.60 | 4.80 | 13.60 | 14.90 |
| 56:20:24 (EX. 10) | 8.70 | 8.00 | −1.70 | −4.40 | −2.40 | −1.20 |

The LPAs used in these examples are all available from Ashland.

Example 11
Synthesis of Isosorbide Modified High-Maleate-Soybean Oil Unsaturated Polyester Resins Maleic anhydride (MAN, 1152 g, 11.7 mol) and anhydrous ethanol (EtOH, 378.8 g, 8.22 mol) were reacted at 175° F. over the course of about 2 hours. Slow addition of ethanol was used to control temperature. Ethylene glycol (EG, 182.3 g, 2.94 mol), isosorbide (ISOS, 429.1 g, 2.94 mol), soybean oil (SOY, 407.2 g, 0.45 mol), hydroquinone (HQ, 110 ppm) and triphenyl phosphite (0.28 g. 0.90 mmol) were added and the mixture was heated to 392° F. As the temperature increased, a mixture of ethanol and water distilled. When distillation ceased, the mixture was cooled to about 300° F. Next, ethylene glycol (EG, 12.5 g, 201 mmol), propylene glycol (PG, 445.0 g, 5.85 mol), hydroquinone (HQ, 110 ppm) and piperazine (2.09 g, 24.5 mmol) in diethylene glycol (DEG, 6.27 g, 59.1 mmol) were added and the mixture was heated to 392° F. Again, a mixture of ethanol and water distilled. The reaction was continued until a Brookfield Cone & Plate viscosity of 5.3-6.1 P (#3 spindle, 212° F.) was reached. The mixture was cooled to about 320° F. and blended with styrene, hydroquinone (HQ, 35 ppm) and copper naphthenate (1 ppm) in a vessel containing water-cooled coils until 71.1% NV.

Example 12 (Comparative)
Synthesis of Non-Modified High-Maleate-Soybean Oil Unsaturated Polyester Resins High-maleate soybean oil UPR not modified with isosorbide was synthesized according to the procedure described in U.S. Pat. Nos. 6,107,446 and 6,222,005, which are incorporated by reference herein in their entirety. This resin had 71.2% NV and was used for comparison purposes.

Examples 13 and 14
Shrinkage Control Measurements of Isosorbide Modified High-Maleate-Soybean Oil Unsaturated Polyester Resins/LPA/Styrene Formulations Several different formulations were evaluated in terms of shrink control by blending ISOS-modified high-maleate-soybean oil UPR (Example 11) and the non-modified high-maleate-soybean oil UPR (Example 12) with different LPA-solutions in styrene. Styrene was added as necessary to adjust polymer percentages in the mixture. One hundred parts of the resin mixture contained approximately 42-43% of solid UPR, 14% of solid LPA, 43-44% styrene, and 0.5% of a 12% solution of cobalt octoate. To the 100 parts of this mixture was added 35 parts of filler consisting of 4:1 mixture of Mica and Diatomaceous Earth (Example 13) or 180 parts of CaCO₃ filler (Example 14), 1.5 parts TBPB initiator, and 4.5 parts zinc stearate mold release agent. The contents were thoroughly mixed and placed in a machined aluminum frame and molded using 15 tons of pressure at 150° C. for two minutes. The solid part was removed from the mold, allowed to cool, and the dimensions of the part were measured and compared to those of the cold frame. The degree of shrinkage was calculated and reported in mils/in, where "mils" represent $10^{-3}$ inches. The following tables show measured shrinkages for different formulations.

TABLE 6

Shrinkage measurements of the ISOS-modified and non-modified high-maleate-soybean oil UPR formulations versus 3 different LPA's using 35 phr filler consisting of 4:1 mixture of Mica and Diatomaceous Earth (Example 13).

| Resin | LPA | | |
|---|---|---|---|
| | LP 40A | ENVIREZ® 2431 | AROPOL™ 59021 |
| | | Shrinkage (mils/in) | |
| ISOS-SOY-UPR (Example 11) | 3.71 | 4.21 | 8.69 |
| Non-Modified SOY-UPR (Example 12) | 5.17 | 5.01 | 17.35 |

TABLE 7

Shrinkage measurements of the ISOS-modified and non-modified high-maleate-soybean oil UPR formulations versus 4 different LPA's using 180 phr of CaCO₃ filler (Example 14)

| Resin | LPA | | | |
|---|---|---|---|---|
| | LP 40A | ELVACITE® 2014 | ENVIREZ® 2431 | AROPOL™ 59021 |
| | | Shrinkage (mils/in) | | |
| ISOS-SOY-UPR (Example 11) | 1.58 | 1.03 | 2.19 | 6.09 |
| Non-Modified SOY-UPR (Example 12) | 2.86 | 2.16 | 3.41 | 16.68 |

Example 15

Synthesis of Isosorbide Modified Poly(Propyleneglycol-Maleate) Unsaturated Polyester Resin Maleic anhydride (1321 g, 13.5 mol), isosorbide (215.8 g, 1.48 mol), propylene glycol (1012 g, 13.3 mol), butylstannoic acid (1.01 g, 4.8 mmol), and hydroquinone (HQ, 162 ppm) were heated to 150° F. The reaction was allowed to exotherm and the reaction temperature was kept below 195° F. Once the exotherm was complete, the reaction was heated to 392° F. The reaction was continued until a Brookfield Cone & Plate viscosity of 4.8-5.5 P (#3 spindle, 302° F.) was reached. The mixture was cooled to about 300° F. and blended with styrene containing tolyihydroquinone (THQ, 200 ppm), parabenzoquinone (PBQ, 20 ppm) and butylated hydroxytoluene (BHT, 50 ppm) in a vessel containing water-cooled coils to 65.4% NV.

Example 16 (Comparative)

Synthesis of Non-Modified Poly(Propyleneglycol-Maleate) Unsaturated Polyester Resin Poly(propyleneglycol-maleate) UPR was synthesized without ISOS, using the same procedure to that described in Example 15. Poly (propyleneglycol-maleate) polyester was diluted with inhibited styrene to 65% NV. This resin was used for comparison purposes.

Examples 17 and 18

Shrinkage Control Measurements of Isosorbide Modified and Regular Poly(Propyleneglycol-Maleate) Unsaturated Polyester Resins/LPA/Styrene Formulations Several different formulations were evaluated in terms of shrink control by blending both ISOS-modified PG-maleate UPRs (Example 15) and non-ISOS-modified PG-maleate UPRs (Example 16) with different low profile additive (LPA)-solutions in styrene. Styrene was added as necessary to adjust polymer percentages in the mixture. One hundred parts of the resin mixture contained approximately 42-43% of solid UPR, 14% of solid LPA, 43-44% styrene, and 0.5% of a 12% solution of cobalt octoate. To the 100 parts of this mixture was added 35 parts of filler consisting of 4:1 mixture of Mica and Diatomaceous Earth (Example 17) or 180 parts of $CaCO_3$ filler (Example 18), 1.5 parts TBPB initiator, and 4.5 parts zinc stearate mold release agent. The contents were thoroughly mixed and placed in a machined aluminum frame and molded using 15 tons of pressure at 150° C. for two minutes. The solid part was removed from the mold, allowed to cool, and the dimensions of the part were measured and compared to those of the cold frame. The degree of shrinkage was calculated and reported in mils/in, where "mils" represent $10^{-3}$ inches. The following tables show measured shrinkages for different formulations. A negative sign in front of the reported values indicates expansion. Expansion defines the part as being larger than the dimensions of the cold frame mold that was used to fabricate it.

TABLE 8

Shrinkage measurements of the ISOS-modified and non-modified PG-maleate UPR formulations versus different LPAs using 35 phr filler consisting of 4:1 mixture of Mica and Diatomaceous Earth (Example 17).

| Resin | LPA | | | |
|---|---|---|---|---|
| | LP 40A | ELVACITE ® 2014 | ENVIREZ ® 2431 | AROPOL ™ 59021 |
| | | | Shrinkage (mils/in) | |
| ISOS-PG-MAN UPR (Example 15) | 0.95 | 1.48 | 2.86 | 0.82 |
| Non-Modified PG-MAN UPR (Example 16) | 1.62 | 1.54 | 3.09 | 1.27 |

TABLE 9

Shrinkage measurements of the ISOS-modified and non-modified PG-maleate UPR formulations versus several different LPA's using 180 phr of $CaCO_3$ filler (Example 18).

| Resin | LPA | | | | |
|---|---|---|---|---|---|
| | LP 40A | ELVACITE ® 2014 | STYRON ™ 663 | ENVIREZ ® 2431 | AROPOL ™ 59021 |
| | | | Shrinkage (mils/in) | | |
| ISOS-PG-MAN UPR (Example 15) | 0.18 | 1.95 | 4.57 | 0.14 | −0.35 |
| Non-Modified PG-MAN UPR (Example 16) | 0.59 | 2.30 | 5.90 | 0.90 | −0.25 |

STYRON ™ 663 is a general purpose polystyrene resin.

Examples 19, 20 and 21

Preparation of Sheet Molding Compounds Using Isosorbide-Modified and Regular Isophthalic Acid/Propylene Glycol Unsaturated Polyester Resins Standard density SMC were formulated by conventional methods using both isosorbide-modified resin made in accordance with Examples 3 and 4 and non-modified (comparative) resin made in accordance with Example 1. The following table, Table 10, shows SMC formulations used in these examples along with comparative properties of molded panels comprising the SMCs. The SMCs were made according to conventional methods using a 24 inch SMC machine. Panels (12"×12") were molded at 300° F. (150° C.) and 75 tons pressure for two minutes. Negative shrinkage values in Table 10 for shrinkage denotes expansion.

TABLE 10

| Formulation | EX. 19 | EX. 20 | EX. 21 |
|---|---|---|---|
| Non-Modified UPR from EX. 1 at 64% NV | 43.75 | 0.00 | 0.00 |
| ISOS-UPR from EX. 3 at 64.8% NV | 0.00 | 43.21 | 0.00 |
| ISOS-UPR from EX. 4 at 65.4% NV | 0.00 | 0.00 | 42.81 |
| Poly(propyleneglycol maleate) UPR at 68.6% NV | 20.41 | 20.41 | 20.41 |
| LP 4016 LPA (40.5% NV) | 29.63 | 29.63 | 29.63 |
| Styrene | 6.21 | 6.75 | 7.15 |
| Total | 100.0 | 100.0 | 100.00 |
| Calcium Carbonate Filler | 180 | 180 | 180 |
| BHT | 0.05 | 0.05 | 0.05 |
| TBPB Initiator | 1.50 | 1.50 | 1.50 |
| Cobalt octoate 12% | 0.05 | 0.05 | 0.05 |
| Zinc Stearate | 4.50 | 4.50 | 4.50 |
| AROPOL ™ D1685 | 3.0 | 3.0 | 3.0 |
| Total A-Side | 291.60 | 291.60 | 291.60 |
| B-side (Mod M, Ashland Inc.) | 2.50 | 2.50 | 2.50 |
| Surface quality | | | |
| ALSA Ashland Index | 100.7 | 95.8 | 89.4 |
| SMC Panel Shrinkage | −0.25 | −0.25 | −0.25 |

Examples 22-27

Preparation of Sheet Molding Compounds Using Isosorbide-Modified and Regular Poly(Propyleneglycol-Maleate) Unsaturated Polyester Resins Standard density SMC were formulated by conventional methods using both isosorbide-modified (Example 15) and non-modified (Example 16) poly(propyleneglycol-maleate) unsaturated polyester resins. The following table, Table 11, shows SMC formulations using three different LPAs and comparative properties of molded panels comprising the SMC. The SMCs were made according to conventional methods using a 24 inch SMC machine. Panels (12"×12") were molded at 300° F. (150° C.) and 75 tons pressure for two minutes. Negative shrinkage values in Table 11 for shrinkage denotes expansion.

TABLE 11

| Formulation | EX. 22 | EX. 23 | EX. 24 | EX. 25 | EX. 26 | EX. 27 |
|---|---|---|---|---|---|---|
| ISOS-UPR from EX. 15 | 0.00 | 64.60 | 0.00 | 64.60 | 0.00 | 64.60 |
| Non-Modified UPR from EX. 16 | 65.00 | 0.00 | 65.00 | 0.00 | 65.00 | 0.00 |
| LP-40A LPA (40% NV) | 35.00 | 35.00 | 0.00 | 0.00 | 0.00 | 0.00 |
| ENVIREZ ® 2431 LPA (51.6% NV) | 0.00 | 0.00 | 27.15 | 27.15 | 0.00 | 0.00 |
| AROPOL ™ 59021 LPA (50.4% NV) | 0.00 | 0.00 | 0.00 | 0.00 | 27.80 | 27.80 |
| Styrene | 0.00 | 0.40 | 7.85 | 8.25 | 7.20 | 7.60 |
| Total | 100.0 | 100.0 | 100.00 | 100.0 | 100.0 | 100.00 |
| Filler (CaCO$_3$) | 180.00 | 180.00 | 180.00 | 180.00 | 180.00 | 180.00 |
| 12% Cobalt Octoate | 0.05 | 0.05 | 0.05 | 0.05 | 0.05 | 0.05 |
| BHT (butylated hydroxyl toluene) | 0.05 | 0.05 | 0.05 | 0.05 | 0.05 | 0.05 |
| TBPB Initiator (tert-butyl peroxyperbenzoate) | 1.5 | 1.5 | 1.5 | 1.5 | 1.5 | 1.5 |
| Zn Stearate | 4.5 | 4.5 | 4.5 | 4.5 | 4.5 | 4.5 |
| Total weight A side | 286.10 | 286.10 | 286.10 | 286.10 | 286.10 | 286.10 |
| B-side (Mod M, Ashland Inc.) | 4.49 | 4.49 | 4.49 | 4.49 | 4.49 | 4.49 |
| % 1" Glass (1" hard chop glass, Owens Corning) | 28 | 28 | 28 | 28 | 28 | 28 |
| Surface quality | | | | | | |
| ALSA Ashland Index | 90.8 | 87.3 | 88.1 | 84.1 | 82.4 | 68.8 |
| Shrinkage (mils/in) | −0.1607 | −0.2262 | −0.2024 | −0.2619 | −0.3095 | −0.5060 |

Examples 28-31

Preparation of Sheet Molding Compounds Using Isosorbide-Modified and Non-Modified High-Maleate-Soybean Oil Unsaturated Polyester Resins/LPA/Styrene Formulations Standard density SMCs were formulated by conventional methods using both isosorbide-modified (Example 11) and non-modified (Example 12) high-maleate soybean oil based unsaturated polyester resins. The following table, Table 12, shows SMC formulations using two different LPAs and comparative properties of molded panels comprising the SMCs. The SMCs were made according to conventional methods using a 24 inch SMC machine. Panels (12"×12") were molded at 300° F. (150° C.) and 75 tons pressure for two minutes. Negative shrinkage values in Table 12 for shrinkage denotes expansion.

TABLE 12

| Formulation | EX. 28 | EX. 29 | EX. 30 | EX. 31 |
|---|---|---|---|---|
| ISOS-SOY UPR from EX. 11 | 0.00 | 59.42 | 0.00 | 59.42 |
| Regular SOY UPR from EX. 12 | 59.34 | 0.00 | 59.34 | 0.00 |
| LP-40A LPA (40% NV) | 35.00 | 35.00 | 0.00 | 0.00 |
| ENVIREZ ® 2431 LPA (51.6% NV) | 0.00 | 0.00 | 27.15 | 27.15 |
| Styrene | 5.66 | 5.58 | 13.51 | 13.43 |
| Total | 100.0 | 100.0 | 100.00 | 100.0 |
| Filler (CaCO$_3$) | 180.00 | 180.00 | 180.00 | 180.00 |
| 12% Cobalt Octoate | 0.05 | 0.05 | 0.05 | 0.05 |
| BHT (butylated hydroxyl toluene) | 0.05 | 0.05 | 0.05 | 0.05 |
| TBPB Initiator (tent-butyl peroxyperbenzoate) | 1.5 | 1.5 | 1.5 | 1.5 |
| Zn Stearate | 4.5 | 4.5 | 4.5 | 4.5 |
| Total weight A side | 286.10 | 286.10 | 286.10 | 286.10 |
| B-side (Mod M, Ashland Inc.) | 1.68 | 1.68 | 1.68 | 1.68 |
| % 1" Glass (1" hard chop glass, Owens Corning) | 28 | 28 | 28 | 28 |
| Surface quality | | | | |
| ALSA Ashland Index | 76.4 | 71.6 | 82.4 | 70.9 |
| Shrinkage (mils/in) | −0.3646 | −0.5093 | −0.3935 | −0.6991 |

Examples 32-34

Preparation of Gelcoated Glass Fiber Reinforced Laminate by Vacuum Bag Infusion Process Using Isosorbide-Modified and Regular Isophthalic Acid/Propylene Glycol Unsaturated Polyester Resins/LPA/Styrene Formulations Gelcoated laminates were prepared using standard vacuum bag molding process. Ashland's MAXGUARD™ NP LG 4077 Gelcoat was sprayed on the glass surface which was previously coated with three layers of Zyvax's SLOPCOAT SYSTEM™ Flex Z 3.0 mold release agent. Gelcoat was catalyzed with 1.5% LUPEROX® DDM-9 initiator (available from Arkema Inc., Philadelphia, Pa., U.S.A.) and left to cure for a couple of hours. Two layers of Owens Corning KNYTEX® MM-15/50/15-49.5 Molding Mat and one layer of KNYTEX® FT DB+MAT 1720-50.0 FlowTex fabric were laid on top of the cured gelcoat and bagged. Vacuum was applied for several hours before low profile additive (LPA)-containing UPR formulations were infused. The unsaturated polyester resin formulations are set forth in Table 13. Example 32 is a control (comparative example having no isosorbide) and comprises an unsaturated polyester resin made in accordance with Example 1 and Examples 33 and 34 comprise an isosorbide-modified unsaturated polyester-resin formulated in accordance with Example 3. Example 33 comprises the same amount of LPA solids as comparative Example 32 and more than the amount of LPA solids in Example 34.

TABLE 13

| Formulation | EX. 32 | EX. 33 | EX. 34 |
|---|---|---|---|
| Non-Modified UPR from EX. 1 at 64% NV | 54.00 | 0.00 | 0.00 |
| ISOS-UPR from EX. 3 at 65.7% NV | 0.00 | 54.00 | 54.00 |
| LP 4016 LPA (41.5% NV) | 16.40 | 16.40 | 13.99 |
| ARQUAD 12-50 | 0.50 | 0.50 | 0.50 |
| Styrene | 23.54 | 23.54 | 25.51 |
| Cobalt octoate 12% | 0.18 | 0.18 | 0.18 |
| 21% Cobalt Hydroxy Ten-Cem ® | 0.06 | 0.06 | 0.06 |
| Methylmethacrylate | 3.36 | 3.36 | 3.64 |
| Divinylbenzene | 1.92 | 1.92 | 2.08 |
| Styrene | 23.54 | 23.54 | 25.51 |
| Dimethylaniline | 0.30 | 0.30 | 0.30 |
| 25% THQ | 0.20 | 0.20 | 0.20 |
| Total | 100.0 | 100.0 | 100.00 |
| % LPA Solids in the formula | 6.80 | 6.80 | 5.80 |
| MMA/ST Ratio | 0.14 | 0.14 | 0.14 |
| DVB/ST Ratio | 0.08 | 0.08 | 0.08 |
| Brookfield LVT#2 Viscosity (cP) | 153 | 163 | 125 |
| RTG Gel Time (min) | 8.10 | 11.30 | 11.80 |
| GPE Time (min) | 6.00 | 5.10 | 4.90 |
| Peak Exotherm (° F.) | 338.0 | 331.6 | 352.0 |
| Surface quality | | | |
| ALSA Ashland Index | 71.1 | 66.2 | 70.1 |
| Distinctness of Image | 51.1 | 64.1 | 49.4 |
| Orange Peel | 7.1 | 7.4 | 6.5 |

The results show that if the level of LPA is maintained constant in the infusion formulation (EX. 32 and EX. 33) surface quality of gelcoated laminate surface will improve if regular UPR resin is substituted with its isosorbide-modified analogue. The results also show that an infusion formulation prepared with isosorbide-modified resin (Example 34 formulation based on ISOS-UPR), can produce a similar surface quality of the gelcoated laminate as the control (Example 32) but at lower LPA level.

What is claimed is:

1. A formulation comprising a) an isosorbide-modified unsaturated polyester comprising maleic acid, fumaric acid, itaconic acid, maleic anhydride or combinations thereof; isosorbide; and glycol other than isosorbide; and b) one or more low profile additives,
wherein the isosorbide is present in an amount of about 10 mole % to about 60 mole % based on the total amount of glycol in the formulation and a sheet molding compound comprising the formulation expands when processed into a molded part by placing the sheet molding compound in a machined aluminum frame and molding the compound using 15 tons of pressure at 150° C. for 2 minutes.

2. The formulation of claim 1 further comprising a copolymerizable solvent.

3. The formulation of claim 2 wherein the copolymerizable solvent is selected from the group consisting of styrene, vinyl toluene, acrylic esters, divinyl benzene, multifunctional acrylates, methacrylates, diallylphthalate and combinations thereof.

4. The formulation of claim 1 further comprising non isosorbide-modified unsaturated polyester resin, vinyl ester resin or combinations thereof.

5. The formulation of claim 1 wherein the isosorbide-modified unsaturated polyester further comprises a dicarboxylic acid selected from the group consisting of isophthalic acid, terephthalic acid, adipic acid, succinic acid and combinations thereof.

6. The formulation of claim 1 wherein the isosorbide-modified unsaturated polyester further comprises succinic anhydride or phthalic anhydride.

7. The formulation of claim 1 wherein the glycol other than isosorbide is selected from the group consisting of ethylene glycol, 1,2-propanediol, 1,3-propanediol, diethylene glycol, dipropylene glycol, neopentyl glycol, hexanediol, butanediol and combinations thereof.

8. The formulation of claim 7 wherein the glycol is incorporated into the isosorbide-modified unsaturated polyester.

9. The formulation of claim 1 wherein the low profile additive is selected from the group consisting of polystyrene, polyesters, polyacrylates, polymethacrylates, polyvinyl acetate, polyurethanes, polyepoxies, polyglycols and combinations thereof.

10. The formulation claim 1 further comprising a chain extending compound.

11. The formulation of claim 10 wherein the chain extending compound is selected from the group consisting of epoxy resin, epoxidized vegetable oil, epoxidized fatty acid, epoxidized fatty acids ester, cycloaliphatic epoxide and combinations thereof.

12. The formulation of claim 11 wherein the epoxy resin comprises glycidyl ethers of bisphenol A.

13. The formulation of claim 10 wherein the chain extending compound comprises polyisocyanate.

14. A molding compound comprising the formulation of claim 1.

15. The molding compound of claim 14 further comprising a component selected from the group consisting of a filler, a reinforcement material, a mold release agent, a viscosity modifier, a low shrink enhancer, an impact modifier, a pigment, a dye, an accelerating agent, a plasticizer and a stabilizer.

16. The molding compound of claim 15 wherein the filler is selected from the group consisting of $CaCO_3$, clay, alumina, trihydrate, talc, wallostonite, carbon black, fumed silica, glass microsphere and combinations thereof.

17. The molding compound of claim 15 wherein the reinforcement material is selected from the group consisting of glass fiber, carbon fiber, boron nitride whisker, natural fiber and combinations thereof.

18. The molding compound of claim 15 wherein the mold release agent is selected from the group consisting of calcium stearate, zinc stearate, magnesium stearate, sodium stearate and combinations thereof.

19. The molding compound of claim 14 further comprising a polymerization initiator.

20. The molding compound of claim 19 wherein the polymerization initiator is selected from the group consisting of peroxide type, azo type and combinations thereof.

21. The molding compound of claim 19 wherein the polymerization initiator is selected from the group consisting of benzoyl peroxide, dicumyl peroxide, methyl ethyl ketone peroxide, lauryl peroxide, cyclohexanone peroxide, t-butyl perbenzoate, t-butyl hydroperoxide, t-butyl benzene hydroperoxide, cumene hydroperoxide, butyl peroctoate, azobisisobutyronitrile, 2-t-butylazo-2-cyano-4-methylpentane, 4-5-butylazo-4-cyano-valeric acid and combinations thereof.

22. A composite article prepared by a process comprising the steps of: a) providing the formulation of claim 1 and b) curing the formulation.

* * * * *